United States Patent [19]

Ebsch

[11] Patent Number: 5,083,475
[45] Date of Patent: Jan. 28, 1992

[54] GEAR SELECTION APPARATUS AND METHOD THEREFOR

[76] Inventor: Allan L. Ebsch, 671 El Prado Rd., Yuma, Ariz. 85364

[21] Appl. No.: 678,652

[22] Filed: Jan. 1, 1991

[51] Int. Cl.$^5$ .............................................. B60K 20/00
[52] U.S. Cl. .................................................. 74/473 R
[58] Field of Search ............................. 74/473 R, 335

[56] References Cited

U.S. PATENT DOCUMENTS

| | | | |
|---|---|---|---|
| 4,567,969 | 2/1986 | Makita | 74/473 R X |
| 4,570,502 | 2/1986 | Klatt | 74/473 R X |
| 4,570,765 | 2/1986 | Makita | 74/473 R X |
| 5,012,888 | 5/1991 | MacInnis | 74/473 R |

Primary Examiner—Dirk Wright
Attorney, Agent, or Firm—Don J. Flickinger; Jordan M. Meschkow

[57] ABSTRACT

An apparatus and technique which assists a driver in manually shifting gears is disclosed. Gears are selected through lateral and longitudinal movements of a shift linkage. Lateral movements cause the shift linkage to move between first extreme, intermediate, and second extreme positions. A first actuator coupled through a control rod and a shift lever loop to the shift lever. A blocking member is positioned on the control rod to engage a shaft of a second actuator when the shift linkage is in its intermediate position. Activation of the first actuator causes the shift linkage to move laterally to its first extreme position. When the second actuator is deactivated, deactivation of the first actuator causes the shift linkage to move laterally to its intermediate position under a spring-applied force. When the second actuator is activated, deactivation of the first actuator causes the shift linkage to move laterally to its second extreme position. The shift lever loop slidably couples to the shift linkage in the longitudinal dimension. Thus, the lateral movements urged by operation of the actuators have substantially no influence on longitudinal shift linkage movements, which may be imposed manually.

16 Claims, 2 Drawing Sheets

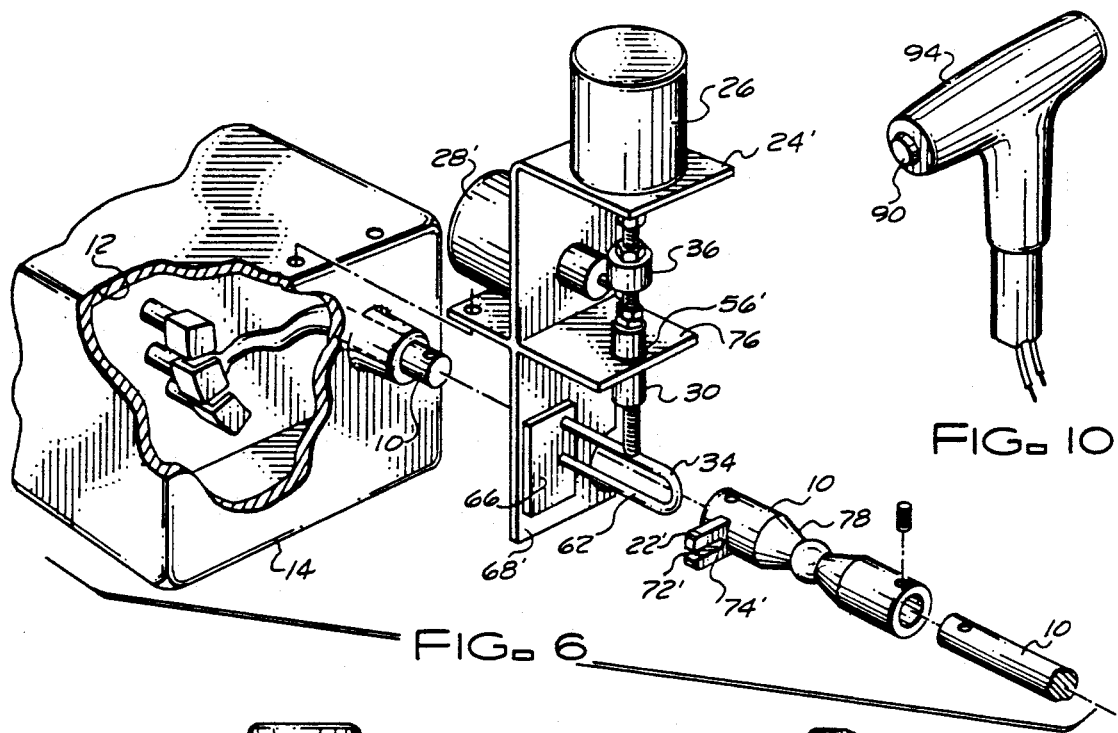
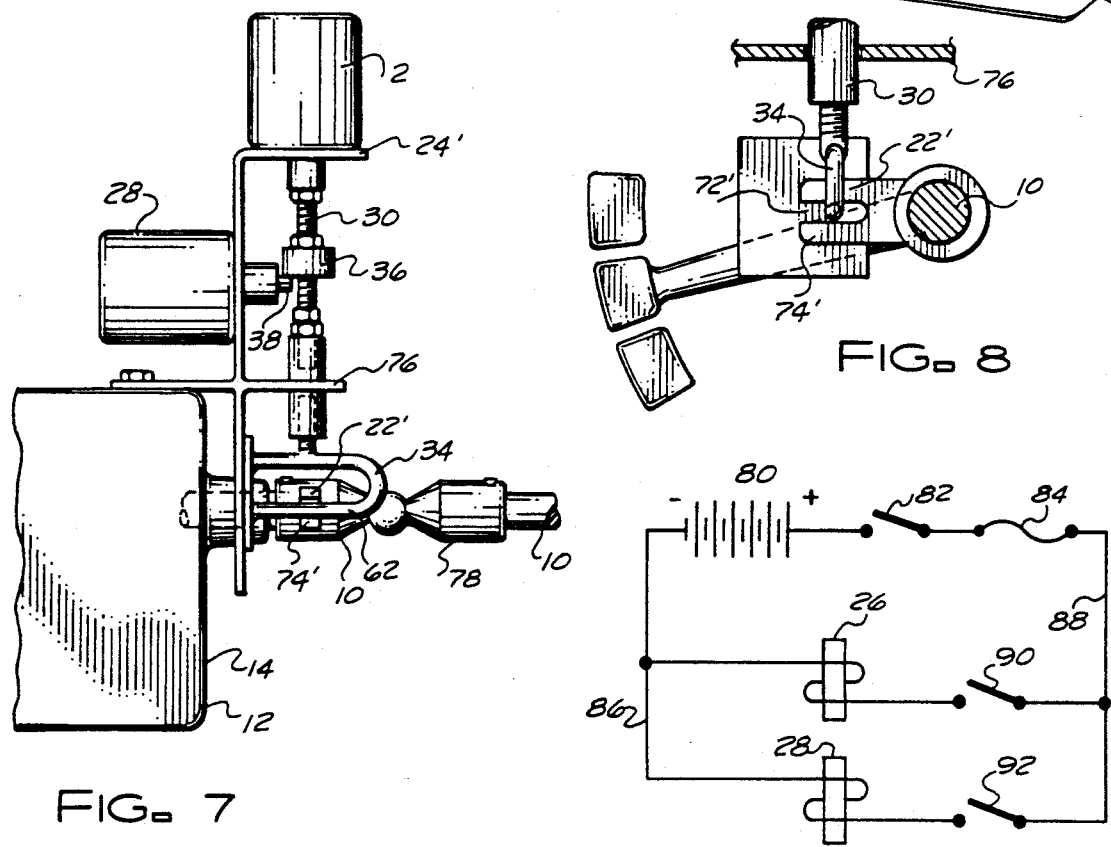

GEAR SELECTION APPARATUS AND METHOD THEREFOR

TECHNICAL FIELD OF THE INVENTION

The present invention relates generally to automotive and other equipment having transmissions in which gears are selected manually. More specifically, the present invention relates to devices and procedures for assisting the manual selection of gears to improve shifting efficiency.

BACKGROUND OF THE INVENTION

In operating a manual transmission, an equipment operator physically manipulates a gear shift lever in conjunction with the operation of a clutch. The gear shift lever is manually moved within a shift pattern. Typically, this movement takes place in a two dimensional plane. In other words, the equipment operator imparts both lateral and longitudinal movement to the shift lever. This movement causes the selection of discrete forward and reverse gears. The lateral and longitudinal movements are transmitted through a shift linkage and imparted to various shift rods within the transmission. Gears are selected when the shift lever reaches corresponding discrete positions in the shift pattern.

The conventional technique of manually imparting lateral and longitudinal movements through a shift linkage works acceptably well for many applications. However, this manual selection process is simply inadequate for other applications. Specifically, in competitive events gear shifting efficiency can be critically important. Missed shifts, in which a transmission is accidently placed in an unintended gear or neutral, degrade shifting efficiency. A single missed shift can cost precious fractions of a second and lead to a lost race.

In particular, missed shifts are a serious problem in connection with a rear-engine or mid-engine vehicle, in which a transmission is located toward the rear of the vehicle. In these configurations, the manual shift linkage which couples the shift lever to the transmission's shift rods can be a relatively large and complicated structure. This type of shift linkage imposes a certain amount of "slop" in transmitting movements at the shift lever to movements of shift rods. Moreover, this type of shift linkage fails to provide the type of accurate feedback that would inform the driver that a desired gear has been selected. Consequently, shifts are missed regularly.

This problem is further exaggerated when such vehicles are used in off-road competitions and for other recreational purposes. In off-road situations a driver experiences a considerable amount of bumping and jostling. Furthermore, this bumping and jostling often occurs while shifting and causes the driver to apply unintended movements to the shift lever. Accordingly, the driver's ability to quickly and accurately position a transmission's shift rods through a shift lever and a massive shift linkage are seriously degraded.

SUMMARY OF THE INVENTION

Accordingly, it is an advantage of the present invention that an improved apparatus is provided which assists in the manual selection of gears.

Another advantage of the present invention is that an improved method of assisted manual gear selection is provided.

Yet another advantage is that the present invention adapts an actuator to a shift linkage to accurately guide lateral movements of the shift linkage.

Another advantage is that the present invention allows an operator to control gear selection by imposing only forces which urge longitudinal movements on a shift linkage.

Still another advantage of the present invention is that accurate lateral shift linkage movements are automatically made by controlled activation and deactivation of an actuator.

The above and other advantages of the present invention are carried out in one form by an improved gear shifter guiding apparatus. The apparatus is used in connection with equipment, such as a vehicle, having a gear shift linkage that moves in first and second dimensions. The apparatus controls movement of the shift linkage in the first dimension to improve shifting efficiency. In the apparatus, a linear actuator has a control rod. This control rod is resiliently biased to move in a first axial direction. However, the control rod moves in a second axial direction, which opposes said first axial direction, when the actuator is activated. The actuator is mounted so that the first and second axial directions of the control rod correspond to said first dimension of the shift linkage. The apparatus additionally includes a coupling device. This coupling device couples the actuator's control rod to the shift linkage. This coupling causes movement of the shift linkage in the first dimension to be substantially influenced by forces exerted through the control rod. In addition, this coupling causes movement of the shift linkage in the second dimension to be substantially uninfluenced by the forces exerted through the control rod.

The above and other advantages of the present invention are carried out in another form by an improved method of assisted manual gear selection. The gear selection takes place within a shifting pattern wherein combinations of lateral and longitudinal movements of a shift linkage cause gear selections. The method calls for activating an actuator having a control rod coupled to the shift linkage to effect lateral movement in a first direction. In addition, the method calls for deactivating the actuator to effect lateral movement in a second direction. Furthermore, the method manually effects forward and backward longitudinal movements of the shift linkage. The manually effected movements are accommodated by slidably coupling the actuator's control rod to the shift linkage.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

FIG. 6 shows an exploded view of a second preferred embodiment of the present invention;

FIG. 7 shows a first side view of the second embodiment of the present invention;

FIG. 8 shows a second side view of a portion of the second embodiment of the present invention in cross section;

FIG. 9 shows a schematic diagram of an electrical circuit utilized in the preferred embodiments of the present invention; and FIG. 10 shows a perspective view of a gear shift lever configured in accordance with the preferred embodiments of the present invention.

DETAILED DESCRIPTION OF THE PREFERRED EMBODIMENTS

Figure 1:
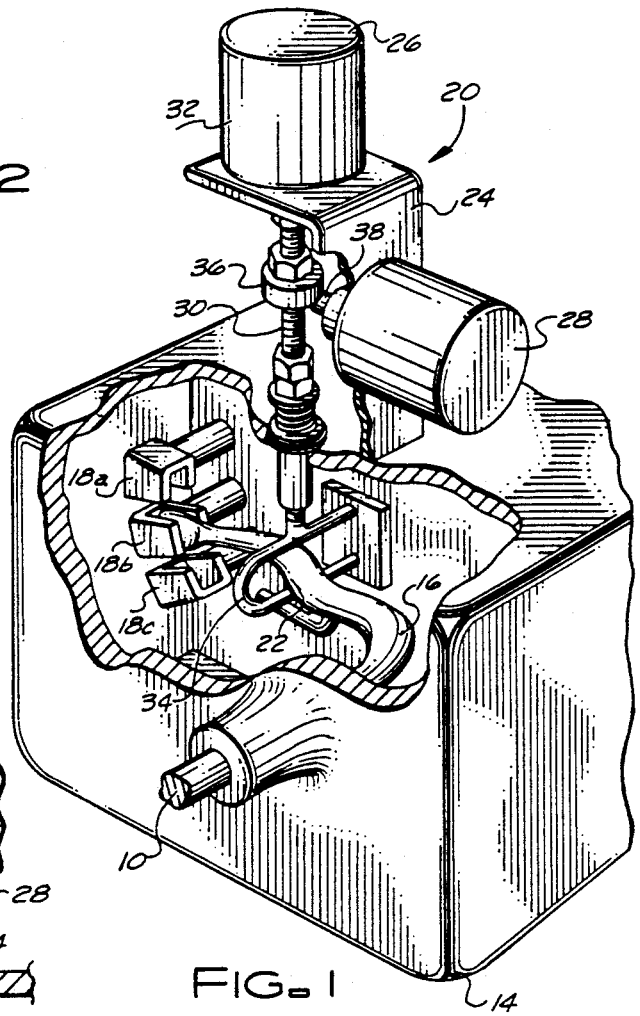
FIG. 1 shows a perspective view of a first preferred embodiment of the present invention.

FIG. 1 shows a perspective view of a first preferred embodiment of the present invention. While this preferred embodiment is specifically designed for 1954–1977 model Volkswagen and Porsche transaxles or gearboxes, those skilled in the art may adapt the teaching of the present invention to other types of transmissions or gearboxes.

As is conventional, a shift linkage 10 extends from an exterior of a housing or case 12 of a transmission 14 to an interior of case 12. Shift linkage 10 extends within case 12 around a curve 16 until it engages shift rods 18a, 18b, and 18c, collectively referred to as shift rods 18. FIG. 1 illustrates transmission 14 in neutral. In other words, shift rods 18 are all aligned and no forward or reverse gear is selected. Moreover, shift linkage 10 may freely move laterally, or up and down in FIG. 1, to engage any one of rods 18. Such lateral movement is accomplished by the rotation of shift linkage 10. While such movement is a rotation, it traverses only a small arc. Accordingly, the lateral movement which occurs as linkage 10 traverses rods 18 may be viewed as occurring substantially within a single dimension.

Shift rods 18 are configured so that all lateral movement of linkage 10 is confined between first and second extreme positions. Linkage 10 engages rod 18a at the first extreme position, and linkage 10 engages rod 18c at the second extreme position. Linkage 10 engages rod 18b at an intermediate position.

Forward and reverse gears are selected by imposing a longitudinal movement, generally left and right in FIG. 1, on linkage 10 once linkage 10 engages a shift rod 18. In particular, a reverse gear is selected by moving rod 18c longitudinally forward, or to the left in FIG. 1. A first forward gear is selected by moving rod 18b longitudinally rearward, and a second forward gear is selected by moving rod 18b longitudinally third forward gear is selected by moving rod 18a longitudinally rearward, and a fourth forward gear is selected by moving rod 18a longitudinally forward.

A gear selection assistor 20 couples to a mating portion 22 of shift linkage 10. Assistor 20 includes a bracket 24 upon which linear actuators 26 and 28 are mounted at right angles to one another. In the preferred embodiment, actuators 26 and 28 are electrical solenoids. A control rod 30 of actuator 26 extends laterally away from a housing 32 of actuator 26 to a shift lever loop 34. It is shift lever loop 34 that couples to mating portion 22 of linkage 10. In addition, a blocking member 36 is locked at an adjustable position on control rod 30. A shaft 38 of actuator 28 operates in cooperation with blocking member 36.

Generally speaking, assistor 20 controls lateral movements of shift linkage 10. On the other hand, longitudinal movements of linkage 10 are not substantially influenced by the operation of assistor 20. Thus, a driver of a vehicle (not shown) in which the present invention is installed controls the shifting of gears by effecting the necessary longitudinal movements of linkage 10 while controlling actuators 26 and 28. In addition, the driver does not need to impart any lateral movements to linkage 10, and any lateral movements accidentally imparted are resisted. As discussed in more detail below, this actuated control of lateral movements permits quick and accurate shifting that practically eliminates missed shifts and greatly improves shifting efficiency.

Figure 2:
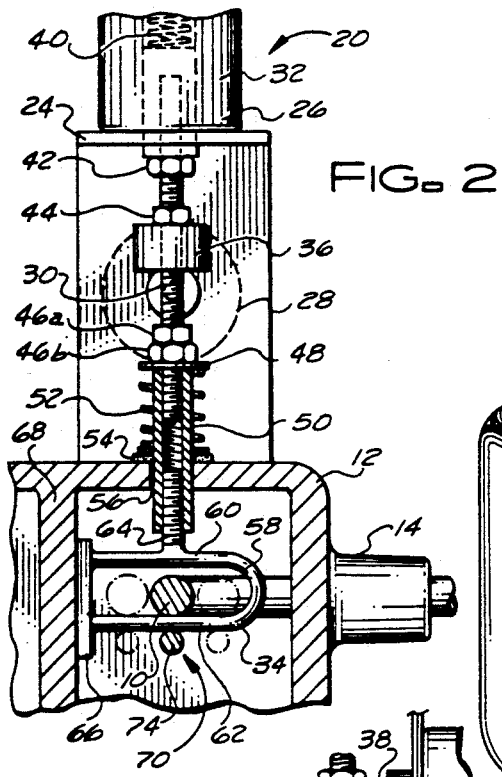
FIG. 2 shows a first cross-sectional side view of the first embodiment of the present invention and illustrates longitudinal movements of a shift linkage.

FIG. 2 shows a first cross-sectional side view of the first preferred embodiment of the present invention. As shown in FIG. 2, actuator 26 includes a resilient member, such as spring 40, that urges control rod 30 laterally downward, with respect to the orientation shown in the figures. Actuator 26 is mounted to bracket 24 at an opening (not shown) in bracket 24 by the use of appropriate fastening means, such as a nut 42. Control rod 30 is preferably threaded. Thus, blocking member 36 is tapped and threadably installed upon control rod 30. Blocking member 36 is locked in place on control rod 30 by a jam nut 44. Jam nuts 46a and 46b are locked in place on control rod 30 beneath, with respect to FIG. 2, blocking member 36. Jam nuts 46 retain a washer 48 and control rod extender 50 at predetermined positions on control rod 30. Extender 50 resembles a pipe or nipple having interior threads that mate with the threads of control rod 30.

A spring 52 coaxially surrounds control rod 30 and extender 50 beneath washer 48. An upper end of spring 50 works against and is retained by washer 48. A lower end of spring 52 works against a felt seal 54. In this first preferred embodiment of the present invention, transmission case 12 has an opening 56 through which extender 50 of control rod 30 passes. Felt seal 54 resides on the outer surface of case 12, and is held in place against case 12 by the operation of spring 52. Seal 54 seals case 12 against shaft extender 50 at opening 56 so that internal fluids do not escape and external dust does not enter case 12.

Figure 5:
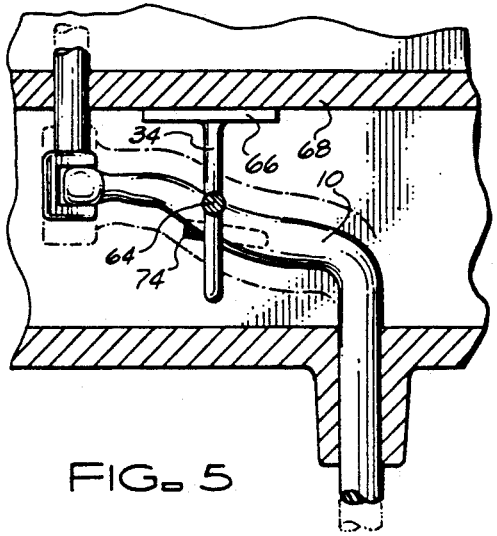
FIG. 5 shows a third cross-sectional side view of the first embodiment of the present invention and illustrates longitudinal movements of the shift linkage and of a shift rod.

Shift lever loop 34 threadably couples to the lower end of extender 50. In particular, shift lever loop 34 includes a curved member 58 having elongated, relatively straight, upper and lower sides 60 and 62, respectively. In short, curved member 58 resembles a U-bolt. As discussed above, forward and rearward longitudinal movements of shift linkage 10 produce gear selections. These longitudinal movements are confined to a predetermined range by the configuration of transmission 14. This range is illustrated in FIGS. 2 and 5 by the positions of shift linkage 10 which are illustrated in phantom. The elongation of sides 60 and 62 is greater than this range. Thus, all longitudinal movements of linkage 10 cause linkage 10 to remain under side 60 and above side 62.

A threaded rod 64 is welded to the central region of upper side 60, and projects generally upward. It is rod 64 that mates with extender 50 of control rod 30 so that shift lever loop 34 travels laterally with movements of control rod 30. However, the slidable coupling provided by shift lever loop 34 allows free longitudinal movement of linkage 10 regardless of any lateral position of control rod 30.

Shift lever loop 34 additionally includes an anti-rotation plate 66 which is welded between upper and lower sides 60 and 62. Plate 66 is welded at the open end of curved member 58. Generally speaking, opening 56 is positioned directly above linkage 10 when transmission 14 is in neutral. Sides 60 and 62 extend longitudinally away from upright rod 64 a sufficient distance so that plate 66 resides adjacent to, but not binding against, a wall 68 of transmission case 12. Accordingly, plate 66 prevents shift lever loop 34 and control rod 30 from rotating. As a result, shift lever loop 34 is prevented from rotating into an orientation that might possibly cause it to bind against shift linkage 10 and impair shifting efficiency.

The coupling between shift lever loop 34 and shift linkage 10 additionally utilizes a loop guide 70 that includes a notch formed between a finger 74 and linkage 10. Loop guide 70 is best shown in the side views of FIGS. 3 and 4. Finger 74 is preferably welded to the lower side of linkage 10 near, but not precisely at, mating portion 22 of linkage 10. Finger 74 projects downward a short distance away from linkage 10 then extends generally parallel to linkage 10 throughout mating portion 22. A notch 72 is formed between finger 74 and linkage 10 throughout mating portion 22, and notch 72 receives lower side 62 of curved member 58.

Figure 3:
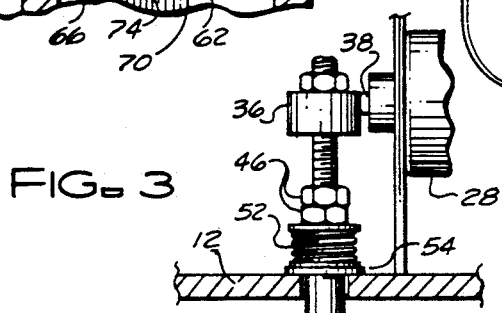
FIG. 3 shows a second cross-sectional side view of the first embodiment of the present invention and illustrates the shift linkage in an extreme lateral position.

The preferred embodiments of the present invention accurately position linkage 10 in the lateral dimension. However, the opening in curved member 58 which accommodates shift linkage 10 must be sufficiently wide to allow linkage 10 to freely assume a range of angles with respect to the axis of control rod 30. As illustrated in FIG. 3, linkage 10 fits relatively loosely between sides 60 and 62 so that no binding will occur as linkage 10 moves to its second extreme position. As a consequence, the pushing and pulling which upper and lower sides 60 and 62 might exert on linkage 10 would not accurately position linkage 10 in the lateral dimension because an undesirably large backlash would result.

On the other hand, lower side 62 fits relatively snugly within notch 72 between finger 74 and linkage 10. As a result, linkage 10 is laterally positioned by forces transmitted through control rod 30 and lower side 62 to finger 74, for downward lateral forces, and to linkage 10 for upward lateral forces. Due to this snug fit, backlash effects are insubstantial and accurate lateral position is achieved.

Figure 4:
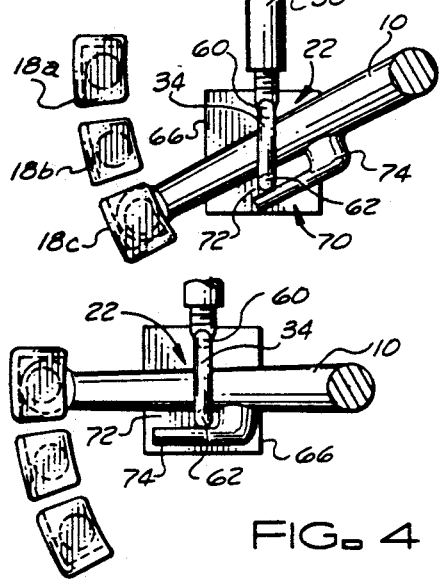
FIG. 4 shows another view of the second cross-sectional side view of the first embodiment of the present invention and illustrates the shift linkage in another extreme lateral position.

In operation, the activation of actuator 26 causes control rod 30 and shift lever loop 34 to move laterally upward and place shift linkage 10 in its first extreme position. Third and fourth forward gears may then be selected by appropriate manually imposed longitudinal movements. This position is illustrated in FIG. 4. Those skilled in the art will appreciate that this retracted position of shift lever loop 34 may be mated to this first extreme position of linkage 10 by adjustments provided through shaft extender 50. Although not shown, those skilled in the art will further appreciate that spring 52 is sufficiently long to retain felt seal 54 against case 12 while control rod 30 is in this retracted position.

When actuator 26 is deactivated, spring 40 urges control rod 30 to move laterally downward. Spring 40 imparts a significantly greater downward force than the upward force imparted by spring 52. Consequently, control rod 30 and linkage 10 move downward. Preferably, the overall lateral downward forces imparted to linkage 10 are considerable so that linkage 10 moves vigorously under forces imparted by spring 40.

Assuming actuator 28 is deactivated, control rod 30 travels laterally downward until blocking member 36 engages shaft 38 (see FIG. 1). When blocking member 36 engages shaft 38, linkage 10 is in its intermediate position, as illustrated in FIGS. 1-2. Those skilled in the art will appreciate that blocking member 36 can be adjustably positioned to mate shift lever loop 34 of gear selection assistor 20 with this intermediate position of linkage 10. In this position linkage 10 is prevented from traveling further laterally downward to its second extreme position by blocking member 36. Thus, transmission 14 cannot be shifted into reverse. While in this intermediate position, third and fourth forward gears may then be selected by appropriate manually-imposed longitudinal movements.

When actuator 28 is activated, shaft 38 (see FIG. 1) is withdrawn and disengages blocking member 36. Assuming that actuator 26 is also deactivated, the downward lateral force imposed by spring 40 causes linkage 10 to move to the second extreme position, as illustrated in FIG. 3. Those skilled in the art will appreciate that jam nuts 46 are positioned sufficiently upward on control rod 30 so that compression of spring 52 does not prevent linkage 10 from reaching its second extreme position. While linkage 10 is in this second extreme position, the reverse gear may be selected by an appropriate manually-imposed longitudinal movement.

As illustrated in FIG. 3, actuator 28 may be deactivated soon after it is activated. Shaft 38 is spring biased to move toward control rod 30 when actuator 28 is deactivated. Thus, shaft 38 simply rides against blocking member 36 after actuator 28 is deactivated. In the preferred embodiment, blocking member 36 has a relatively smooth surface that permits substantially unrestricted lateral movement while shaft 38 is riding against its surface.

A driver may shift from reverse to first by momentarily activating actuator 26 to impose upward lateral movement on linkage 10. This lateral movement allows blocking member 36 to clear shaft 38 (See FIG. 1) so that shaft 38 automatically moves toward control rod 30. After removal of the lateral forces, spring 40 (see FIG. 2) causes blocking member 36 to engage shaft 38, and linkage 10 then resides at its intermediate position. This may occur very quickly. The driver may then impose the appropriate longitudinal movement to select the first forward gear.

The driver may shift from first to second or vice versa by imposing the appropriate longitudinal movements while refraining from activating actuator 26. Control rod 30 resists any lateral forces accidently imposed by the driver due to forces imposed by spring 40. Blocking member 36 remains engaged with shaft 38 of actuator 28, and linkage 10 remains in its intermediate position.

The driver preferably shifts from second gear to third gear by first activating actuator 26 then manually imposing a longitudinal motion to linkage 10. As soon as longitudinal movement causes linkage 10 to reach the neutral position (see FIG. 1), linkage 10 is free to vigorously move to its first extreme position under the considerable forces imposed by the activation of actuator 26. Continued longitudinal movement of linkage 10 places transmission 14 in third gear.

The driver preferably activates actuator 26 while shifting from third gear to fourth gear, and vice versa.

This causes linkage 10 to remain in its first extreme position and to resist any accidental lateral forces manually imposed by the driver. On the other hand, the driver preferably deactivates actuator 26 while shifting from third gear to second gear. The needed lateral forces will be imposed by spring 40 (see FIG. 2), and lateral positioning will be determined by the engagement of blocking member 36 against shaft 38 (see FIG. 1).

In the first preferred embodiment of the present invention, shift lever loop 34 resides within case 12 at a position very near to shift rods 18 (see FIG. 1). This is advantageous because the closer mating portion 22 of linkage 10 is to shift rods 18 the more accurately and quickly lateral movements can be imposed on linkage 10. On the other hand, this embodiment imposes complication in connection with mounting gear selection assistor 20 to transmission case 12 and in sealing case 12.

FIGS. 6-8 show the second preferred embodiment of the present invention. In this second embodiment, a gear selection assistor 20' couples to linkage 10 outside of case 12. In other words, a mating portion 22' of linkage 10 for the second embodiment resides outside of case 12. No sealing of case 12 is required.

As shown in FIGS. 6-7, a bracket 24' attaches to case 12 but has a slightly different configuration than the above-discussed bracket 24. As above, actuators 26 and 28 mount at right angles to one another. Actuators 26 and 28, control rod 30, blocking member 36, and shift lever loop 34 all operate substantially as discussed above in connection with the first embodiment. However, bracket 24' positions actuator 26 so that control rod 30 resides slightly to one side of linkage 10. In addition, bracket 24' includes a shelf 76 having an opening 56' through which control rod 30 passes. Shelf 76 serves to prevent control rod 30 from exerting longitudinal forces. Bracket 24' also includes a wall 68' which serves the same function as wall 68 discussed above in connection with the first embodiment.

In this second embodiment, mating portion 22' and a finger 74' are preferably welded to a shaft interface 78. Interface 78 represents one of many portions of linkage 10 and resides near case 12. Mating portion 22' and finger 74' move with and become a part of linkage 10. A notch 72' is formed between mating portion 22' and finger 74'. While exhibiting a different configuration, mating portion 22', notch 72' and finger 74' function with respect to shift lever loop 34 substantially as discussed above in connection with the first preferred embodiment. Specifically, portion 22' is confined within shift lever loop 34, and loop 34 is dimensioned so that portion 22' is only loosely confined therein. Portion 22' is free to slide longitudinally within loop 34. Lower side 62 of loop 34 fits snugly within notch 72'. Thus, lateral movement is imparted to linkage 10 by forces transmitted through control rod 30 to linkage 10 in the vicinity of mating portion 22'.

FIG. 9 shows a schematic diagram of an electrical circuit utilized in the preferred embodiments of the present invention. As discussed above, actuators 26 and 28 (see FIGS. 1 and 6) are preferably electrical solenoids. Actuators 26 and 28 are activated or energized by a conventional vehicle battery 80. In particular, battery 80, a vehicle ignition switch 82, and a fuse 84 are coupled in series between a vehicle ground 86 and an actuator supply node 88. A solenoid coil of actuator 26 is coupled in series with a normally open, momentary, switch 90 between ground 86 and node 88. Likewise, a solenoid coil of actuator 28 is coupled in series with a normally open, momentary, switch 92 between ground 86 and node 88. Consequently, actuators 26 and 28 may be activated only when vehicle ignition is on. When ignition is on, actuators 26 and 28 are independently activated by physically manipulating switches 90 and 92, respectively.

FIG. 10 shows a perspective view of a gear shift lever 94 configured in accordance with the preferred embodiments of the present invention. Preferably, lever 94 is a conventional "T" handled type of shift lever, which is easily grabbed and operated by a driver. Switch 90, which controls the activation of actuator 26 (see FIG. 9), is mounted in an upper side of lever 94 so that it may be physically manipulated by the driver's thumb. Since switch 90 is located upon shift lever 94, the driver may easily control the activation and deactivation of actuator 26 while in the act of shifting gears.

Switch 92 is utilized only in connection with shifting into reverse. Thus, the location of switch 92, which controls the activation of actuator 28 (see FIG. 9), is not a critical feature of the present invention. However, switch 92 is preferably located at any convenient position for operation by the driver's left hand (not shown).

In summary, the present invention provides an improved apparatus and method for assisting in the manual selection of gears. The present invention adapts an actuator to a shift linkage. The actuator accurately guides lateral movements of the shift linkage. Consequently, an operator controls gear selection by imposing only longitudinal movements on the shift linkage. The lateral movements are automatically controlled by the activation and deactivation of the actuator in response to the driver's operation of a switch located on a shift lever.

The present invention has been described above with reference to preferred embodiments. However, those skilled in the art will recognize that changes and modifications may be made in these preferred embodiments without departing from the scope of the present invention. For example, those skilled in the art will recognize that the various shapes depicted herein may undergo substantial revision. Further, those skilled in the art will recognize that the terms forward/rearward, upward/downward, lateral/longitudinal, and the like used herein refer to directions which are relative to one another. No absolute orientations or directions are implied. These and other changes and modifications which are obvious to those skilled in the art are intended to be included within the scope of the present invention.

What is claimed is:

1. A gear shifter guiding apparatus for use in connection with equipment having a gear shift linkage movable in at least a first dimension to select any one of three shift rods and in a second dimension to move a selected one of said shift rods, said apparatus controllably restricting movement of said shift linkage in said first dimension to improve shifting efficiency, and said apparatus comprising:

a linear actuator having a control rod, said control rod being resiliently biased to move in a first axial direction, said control rod moving in a second axial direction which opposes said first axial direction when said actuator is activated, and said actuator being mountable so that said first and second axial directions correspond to said first dimension;

a blocking member positioned on said actuator control rod;

a second actuator having a shaft movable to selectably engage said blocking member and to restrict movement of said control rod; and means for coupling said control rod to said shift linkage so that movement of said shift linkage in said first dimension is substantially influenced by forces exerted through said control rod and so that movement of said shift linkage in said second dimension is substantially uninfluenced by said forces exerted through said control rod.

2. An apparatus as claimed in claim 1 wherein:

first and second ones of said three shift rods are associated with forward gears and a third one of said three shift rods is associated with a reverse gear; and said blocking member is positioned on said control rod so that when said second actuator shaft is positioned to engage said blocking member, movement of said control rod in said first axial direction is restricted to allow said shift linkage to select only one of said first and second shift rods.

3. An apparatus as claimed in claim 2 wherein, when said second actuator is controlled so that said second actuator shaft is positioned to refrain from engaging said blocking member, said control rod is movable in said first axial direction to select said third shift rod.

4. A gear shifter guiding apparatus for use in connecting with equipment having a gear shift linkage movable between first and second extreme positions in a first dimension and movable in a second dimension, said apparatus controllably restricting movement of said shift linkage in said first dimension to improve shifting efficiency, and said apparatus comprising:

a linear actuator having a control rod, said control rod being resiliently biased to move in a first axial direction, said control rod moving in a second axial direction which opposes said first axial direction when said actuator is activated, and said actuator being mountable so that said first and second axial directions correspond to said first dimension; and means for coupling said control rod to a said shift linkage so that movement of said shift linkage in said first dimension is substantially influenced by forces exerted through said control rod, so that movement of said shift linkage in said second dimension is substantially uninfluenced by said forces exerted through said control rod, so that said shift linkage automatically moves to said first extreme position when said actuator is not actuated, and so that said shift linkage automatically moves toward said second extreme position when said actuator is actuated.

5. An apparatus as claimed in claim 4 wherein said control rod comprises a length-adjusting member for mating axial position of said coupling means with one of said first and second extreme positions of said shift linkage.

6. A gear shifter guiding apparatus for use in connection with equipment having a gear shift linkage movable in at least first and second dimensions and for controllably restricting movement of said shift linkage in said first dimension to improve shifting efficiency, said apparatus comprising:

a linear actuator having a control rod, said control rod being resiliently biased to move in a first axial direction, said control rod moving in a second axial direction which opposes said first axial direction when said actuator is activated, and said actuator being mountable so that said first and second axial directions correspond to said first dimension; and a curved member for coupling said control rod to said shift linkage, said curved member having opposing sides and being dimensioned so that a portion of said shift linkage fits between said opposing sides, said control rod being connected to one of said opposing sides of said curved member so that movement of said shift linkage in said first dimension is substantially influenced by forces exerted through said control rod and so that movement of said shift linkage in said second dimension is substantially uninfluenced by said forces exerted through said control rod.

7. An apparatus as claimed in claim 6 wherein:

said coupling means additionally comprises a finger attached to said shift linkage, said finger being configured so that a notch for retaining one of said opposing sides is formed between said finger and said portion of said shift linkage;

said finger is spaced apart from said shift linkage so that said one of said opposing sides fits relatively snugly between said finger and said shift linkage; and said opposing sides of said curved member are spaced apart so that said portion of said shift linkage fits relatively loosely between said opposing sides.

8. An apparatus as claimed in claim 6 wherein movement of said shift linkage in said second dimension is confined within a predetermined range, and wherein:

each of said opposing sides of said curved member extend for a distance greater than said predetermined range.

9. An apparatus as claimed in claim 6 wherein:

said portion of said shift linkage resides near a wall which extends in said first dimension;

said control rod attached to said curved member so that no relative movement occurs between said control rod and said curved member;

said curved member additionally comprises an anti-rotation member attached to at least one of said opposing sides thereof; and said actuator is mounted relative to said wall so that said anti-rotation member moves adjacent to said wall as said control rod moves in said first and second directions and so that said anti-rotation member prevents substantial rotation of said curved member by contact with said wall.

10. An apparatus as claimed in claim 9 wherein:

said portion of said shift linkage and said coupling means reside outside of a transmission housing; and said apparatus additionally comprises a bracket mounted to said equipment proximate said portion of said shift linkage, said bracket having a first portion which serves as said wall, and said bracket having a second portion to which said actuator is mounted.

11. A method of assisted manual gear selection within a shifting pattern wherein combinations of lateral and longitudinal moments of a shift linkage cause gear selections through longitudinal movement occurring after lateral movement has positioned said shift linkage in one of first extreme, intermediate, and second extreme positions, said method comprising the steps of:

activating an actuator having a control rod coupled to said shift linkage to effect lateral movement in a first direction, said activating step urging said shift linkage to said first extreme position;

deactivating said actuator to effect lateral movement in a second direction, said deactivating step urging said shift linkage to said second extreme position when a second actuator is activated, and said deactivating step urging said shift linkage to said intermediate position when said second actuator is deactivated; and manually effecting forward and backward longitudinal movements of said shift linkage, said manually effected movements being accommodated by slidably coupling said actuator to said shift linkage.

12. A method as claimed in claim 11 wherein first and second forward gears are selected through longitudinal movements when said shift linkage is at said intermediate lateral position, and third and fourth forward gears are selected through longitudinal movements when said shift linkage is at said first extreme position, and said manually effecting step comprises, while performing said activating step, the steps of:

shifting from said second gear to said third gear by manually exerting a forward longitudinal force;

shifting from said third gear to said fourth gear by manually exerting a rearward longitudinal force; and shifting from said fourth gear to said third gear by manually exerting a forward longitudinal force.

13. A method as claimed in claim 11 wherein first and forward gears are selected through longitudinal movements when said shift linkage is at said intermediate lateral position, and third and fourth forward gears are selected through longitudinal movements when said shift linkage is at said first extreme position, and said manually effecting step comprises, while performing said deactivating step, the steps of:

shifting from said first gear to said second gear by manually exerting a rearward longitudinal force;

shifting from said third gear to said second gear by manually exerting a rearward longitudinal force; and shifting from said second gear to said first gear by manually exerting a forward longitudinal force.

14. A gear shifter guiding apparatus for use with equipment having a gear shift linkage movable in lateral directions and longitudinal directions and for controllably restricting movement of said shift linkage in said lateral directions to improve shifting efficiency, said apparatus comprising:

a first actuator having a control rod, said control rod transmitting a spring-generated force in a first one of said lateral directions when said actuator is deactivated, and said control rod transmitting an actuation-generated force in a second one of said lateral directions upon activation of said actuator;

a blocking member coupled to said control rod;

a second actuator having a shaft spring biased to engage said blocking member to prevent movement of said blocking member beyond said shaft in said first lateral direction, and said shaft being withdrawn from engagement with said blocking member when said second actuator is activated so that said blocking member is allowed to move beyond said shaft; and means for coupling said control rod to said shift linkage so that movement of said shift linkage in said lateral directions is substantially influenced by said forces exerted through said control rod and so that movement of said shift linkage in said longitudinal directions is substantially uninfluenced by said forces exerted through said control rod.

15. A gear shifter guiding apparatus as claimed in claim 14 wherein said coupling means comprises a rigid curved member having opposing sides and dimensioned so that a portion of said shift linkage fits between said opposing sides, said control rod being connected to one of said opposing sides of said curved member.

16. A gear shifter guiding apparatus as claimed in claim 15 wherein:

said coupling means additionally comprises a finger attached to said shift linkage, said finger being configured so that a notch for retaining one of said opposing sides is formed between said finger and said portion of said shift linkage;

said finger is spaced apart from said shift linkage so that said one of said opposing sides fits relatively snugly between said finger and said shift linkage; and said opposing sides of said curved member are space depart so that said portion of said shift linkage fits relatively loosely between said opposing sides.

* * * * *

UNITED STATES PATENT AND TRADEMARK OFFICE
CERTIFICATE OF CORRECTION

PATENT NO. : 5,083,475

DATED : January 28, 1992

INVENTOR(S) : Allan L. Ebsch

It is certified that error appears in the above-identified patent and that said Letters Patent is hereby corrected as shown below:

Column 9,
In Claim 4, line 43, delete "a".

Col. 10, line 39, change "attached" to --attaches--.

Col. 13, line 30, insert --second-- before "forward".

Col. 14, line 42, change "space" to --spaced--.

Col. 14, line 43, delete "depart" and insert --apart--.

In [57] ABSTRACT, line 6, change "coupled" to --couples--.

Signed and Sealed this

Twentieth Day of April, 1993

Attest:

MICHAEL K. KIRK

*Attesting Officer*  *Acting Commissioner of Patents and Trademarks*